R. ATHERTON.
Steam-Blower.

No. 210,832. Patented Dec. 17, 1878.

Witnesses
Charles E. Sandford
P. Sandford

Inventor
Rob't Atherton

UNITED STATES PATENT OFFICE.

ROBERT ATHERTON, OF PATERSON, NEW JERSEY, ASSIGNOR OF ONE-HALF HIS RIGHT TO WILL HAGUE, OF SAME PLACE.

IMPROVEMENT IN STEAM-BLOWERS.

Specification forming part of Letters Patent No. 210,832, dated December 17, 1878; application filed July 27, 1878.

*To all whom it may concern:*

Figure 1:
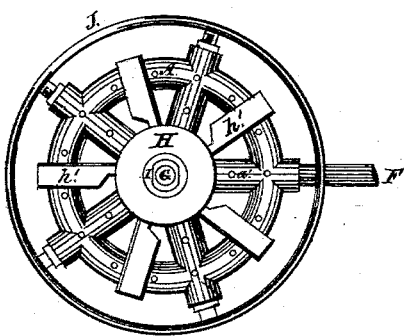
Figure 2:
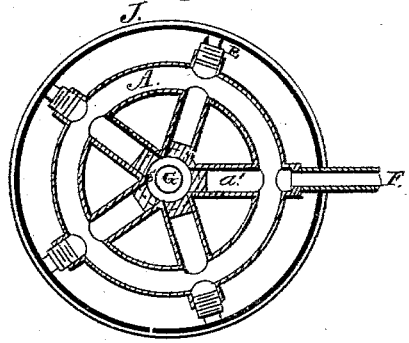
Figure 3:
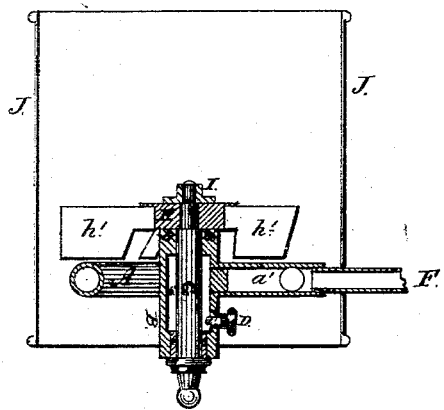

Be it known that I, ROBERT ATHERTON, of the city of Paterson, in the county of Passaic and State of New Jersey, have invented a new and useful Improvement in Steam-Blowers, of which the following is a specification:

Figure 1 is a plan view of my improved steam-blower. Fig. 2 is a cross-section of the same. Fig. 3 is a longitudinal through-section of the same.

Similar letters of reference indicate corresponding parts.

The object of this invention is to supply to every class of steam-boilers an increased and abundant draft for the purpose of generating any desired pressure of steam in a speedy and inexpensive manner, by applying it immediately below the grate-bars through an aperture in the ash-pit or any other convenient place.

The invention consists in the hollow perforated frame, formed by the combination of the hollow rim, partially-hollow and partially-solid arms, recessed center, bush, oil-hole and plug for same in center, and the plugs and connecting-pipe in rim, in combination with shaft, fan, nut, and outside case, as hereinafter fully described.

A is the hollow rim of the perforated frame. A' are the partially-hollow and partially-solid arms. B is the center of the frame, which center is bored or cored out to suitable sizes at each end. C is a bush, which is securely fitted into the larger hole of the center B, the inside diameter of the bush C corresponding with that of the smaller hole in the center B, thus forming the recess $b'$, which is a receptacle for oil or any other lubricating substance. $d'$ is an oil-hole in said center B, which is securely closed by the screw-plug D, thus preventing the admission of dirt or grit. E are screw-plugs, which are securely screwed into all but one of the projections in the hollow rim A, (said projections being continuations of the arms $a'$, which may be cast solid and drilled or cored out,) and left any desirable length for the purpose of securing a sufficient space for the admission of cold air from the outside between the hollow rim A and the outside case, J. F is the connecting-pipe, which is securely screwed into the remaining projection in the hollow rim A, and connected with a suitable pipe or opening in the boiler. G is a shaft, with a collar turned on one end, from which collar said shaft is of uniform diameter the entire length of the center B, at which point it is turned down, leaving a shoulder on the small end, and against said shoulder is fitted the fan H, which has blades $h'$. Said blades may be fitted spirally or as shown. The shaft G is turned down again, leaving another shoulder, the small end of shaft having a thread cut thereon, and the nut I fitted to screw tight against said shoulder, thereby securely fastening the fan H on the shaft G. J is the outside case, having a hole or slot cut therein, through which the connecting-pipe F passes. Said outside case may be fastened in the aperture intended for the same.

Steam is turned on by means of a globe-valve or cock, passes through the connecting-pipe F into the hollow rim A and partially-hollow arms $a'$, escapes through the small holes or perforations in said rim A and arms $a'$, and comes in contact with the blades $h'$ of the fan H, causing the same to revolve with an astonishing velocity. The cold air from the outside rushes through the openings between the inside of the case J, the hollow rim A, and the arms $a'$.

Having thus described my invention, I claim as new and desire to secure by Letters Patent—

1. The hollow perforated frame formed by the combination of the hollow rim A, partially-hollow and partially-solid arms $a'$, recessed center B $b'$, bush C, oil-hole $d'$, and plug D in center, and the plugs E and connecting-pipe F in rim, substantially as herein shown and set forth.

2. The combination of the hollow perforated frame formed by the combination of the hollow rim A, partially hollow and partially-solid arms $a'$, recessed center B $b'$, bush C, oil-hole $d'$, and plug D in center and the plugs E and connecting-pipe F in rim, shaft G, fan H, nut I, and the outside case, J, with each other, substantially as herein shown and set forth.

ROBERT ATHERTON.

Witnesses:
WILL HAGUE,
W. J. ATKINSON.